United States Patent [19]

Van Polen

[11] 3,880,305
[45] Apr. 29, 1975

[54] BALE HANDLING APPARATUS

[76] Inventor: James C. Van Polen, R.R. No. 2, Bussey, Iowa 50044

[22] Filed: Sept. 17, 1973

[21] Appl. No.: 398,221

[52] U.S. Cl. .......... 214/147 G; 214/DIG. 4; 294/61
[51] Int. Cl.............................................. B66f 9/18
[58] Field of Search............ 214/653, 147 R, 147 G, 214/6 B, 77 R, 77 D, DIG. 4; 294/61, 104, 67 BC

[56] References Cited
UNITED STATES PATENTS

| 2,390,293 | 12/1945 | Colson | 294/DIG. 4 |
| 2,706,570 | 4/1955 | Jewell | 214/653 |
| 3,587,218 | 6/1971 | Geary | 214/147 R X |
| 3,734,304 | 5/1973 | Cabaniss | 214/1 D X |

Primary Examiner—Robert J. Spar
Assistant Examiner—George F. Abraham
Attorney, Agent, or Firm—Rudolph L. Lowell

[57] ABSTRACT

The apparatus for lifting and transporting hay bales includes a main upright frame mountable for up and down movement on the three point hitch of a farm tractor. A pair of bale clamping arms are movably mounted at opposite sides of the main frame for pivotal up and down movement rearwardly of the tractor in upright planes extending generally longitudinally of the tractor, and for pivotal movement toward and away from each other in planes extended generally transversely of the tractor. The free end of each arm carries bale gripping prongs on the arms being extended toward each other.

7 Claims, 16 Drawing Figures

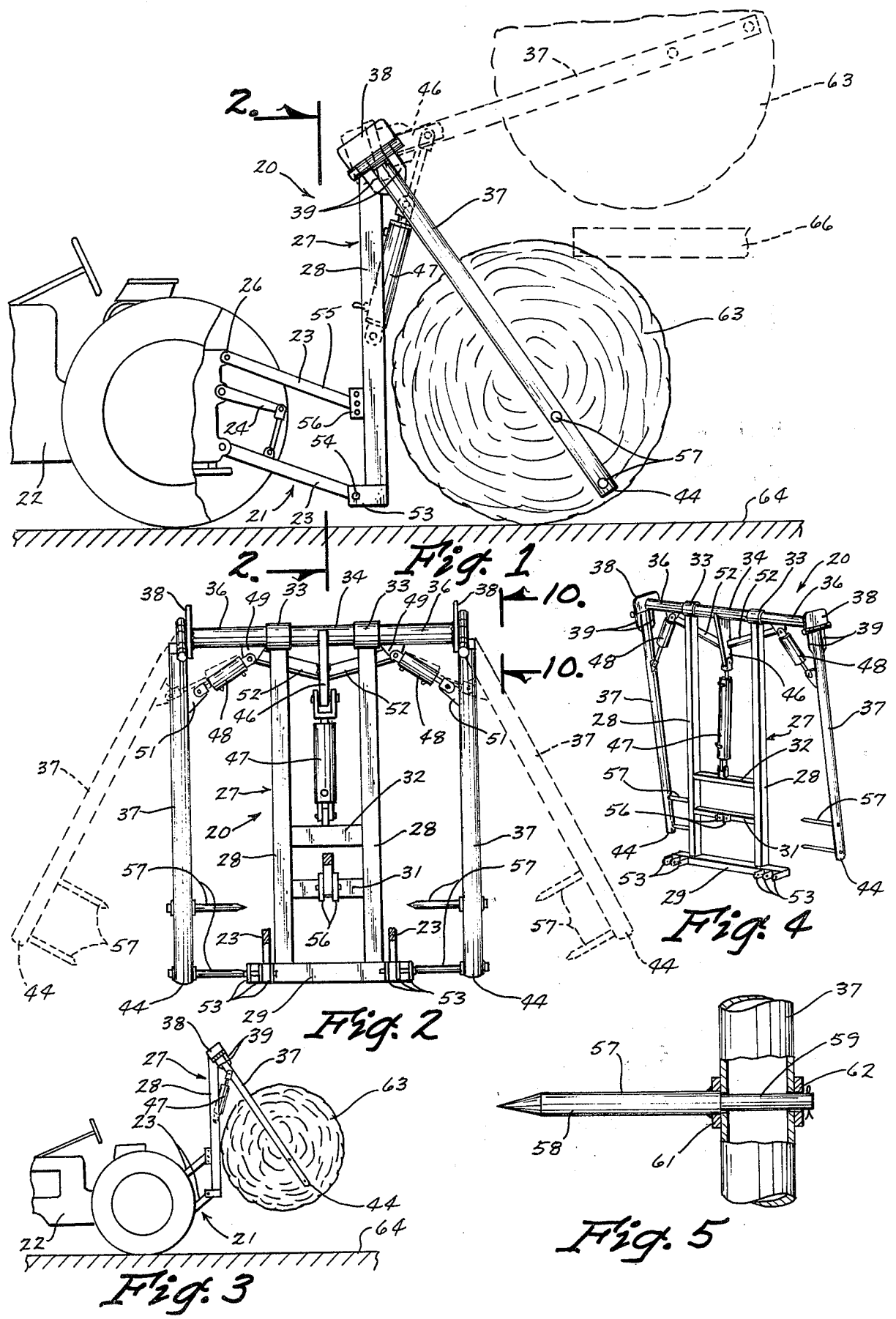

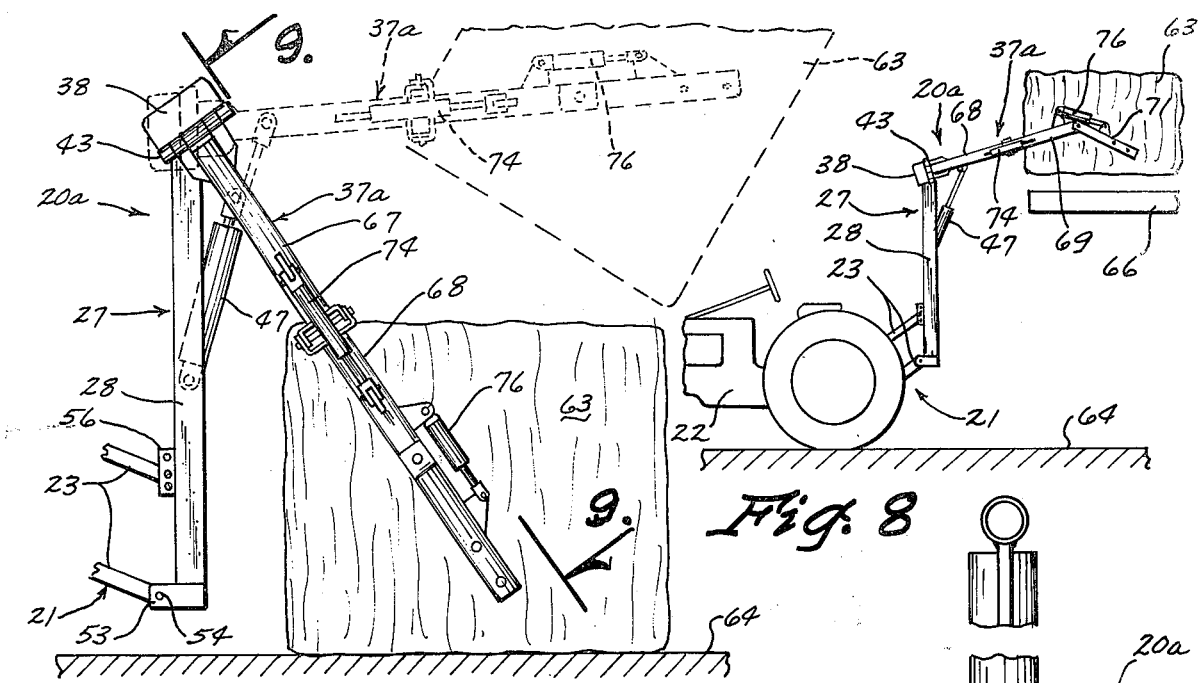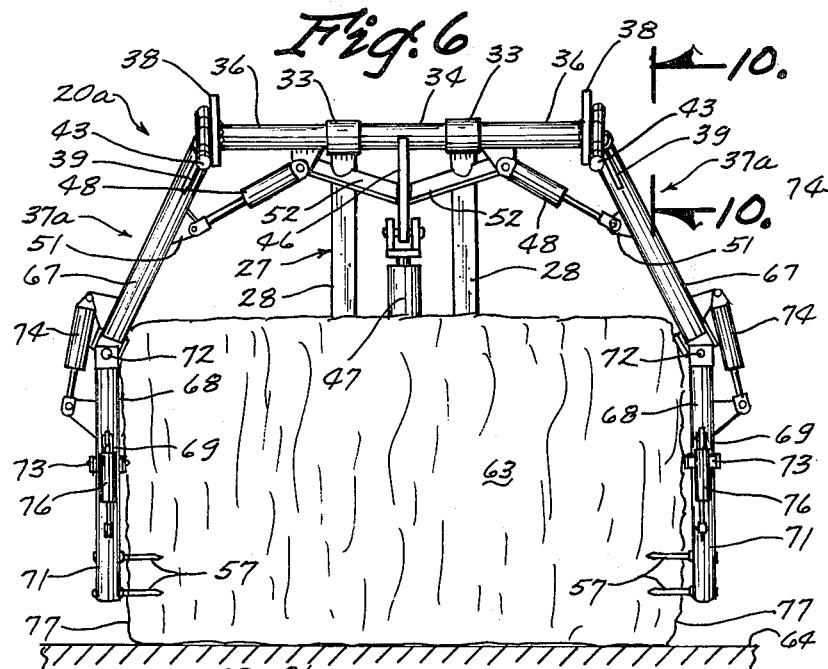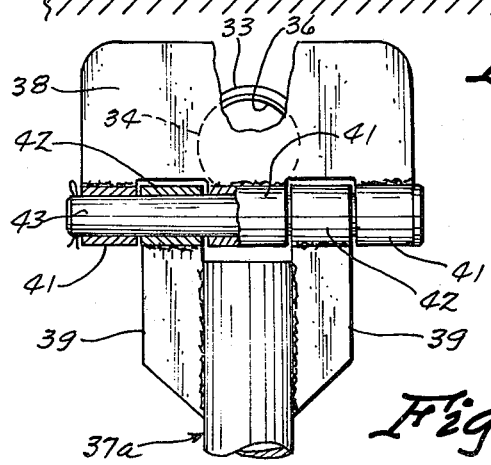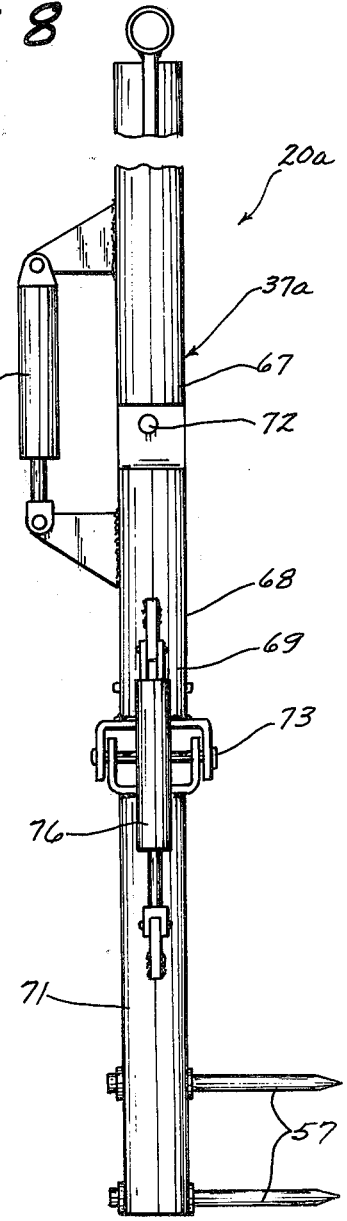

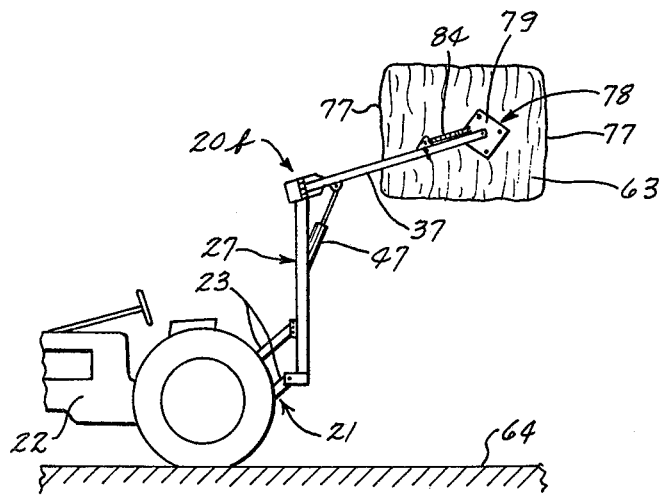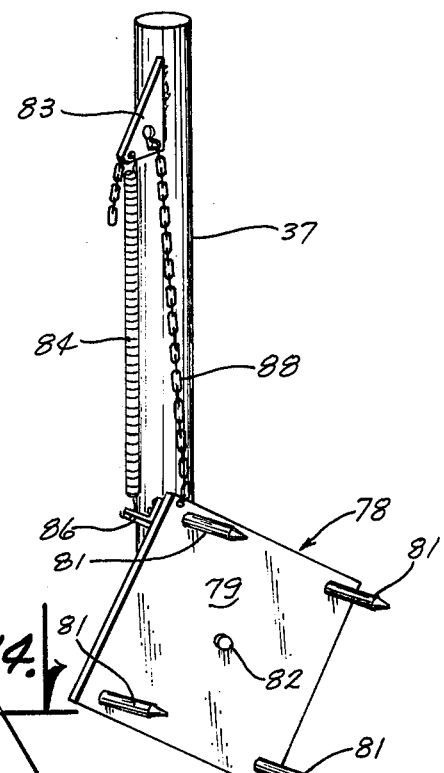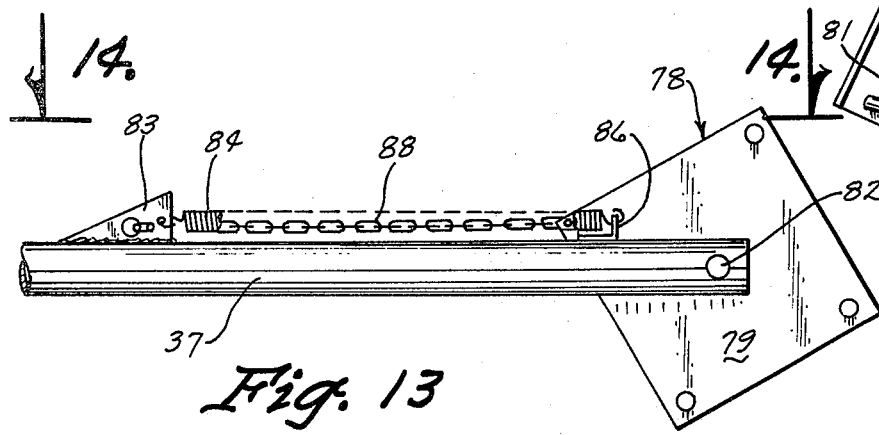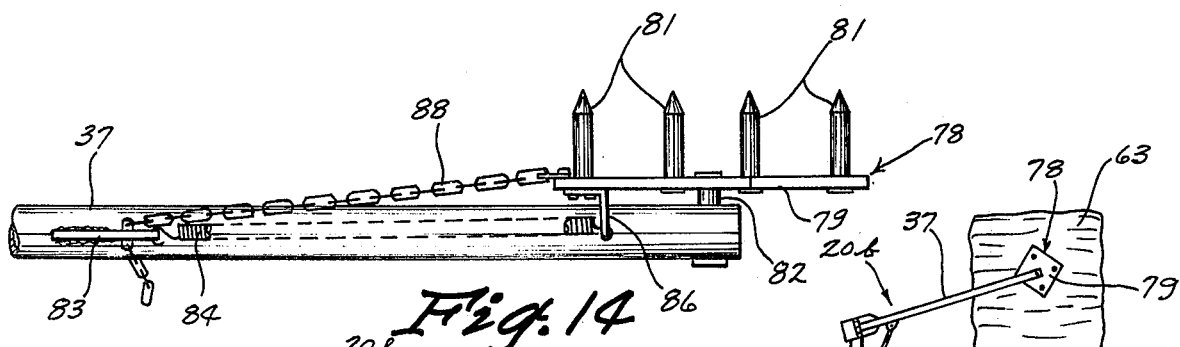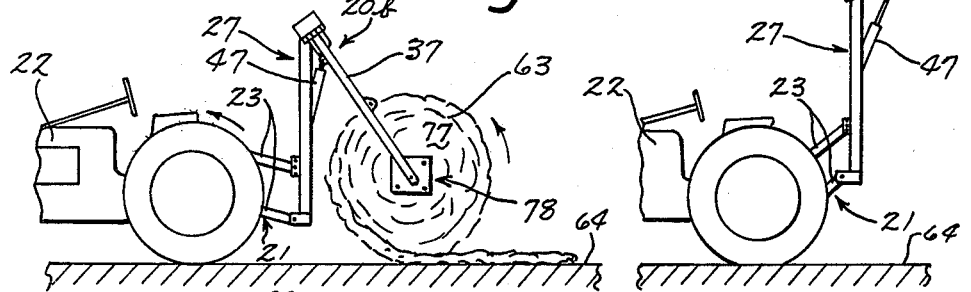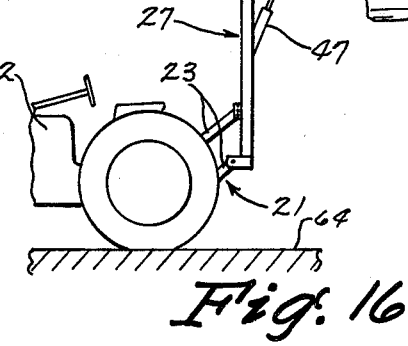

BALE HANDLING APPARATUS

SUMMARY OF THE INVENTION

The bale handling apparatus is of a simple and rugged construction, capable of being quickly and easily mounted on a tractor, and efficient in operation to pick up bales for transport and for stacking in either upright or horizontal positions. The base clamping arms are pivotally movable about a pair of axes arranged normal to each other to provide for their dual function to both clamp a bale therebetween and then lift the clamped bale to an elevated stacking position. The free or outer end sections of the arms can be of an articulated construction and the bale gripping prong assemblies can be adjustably mounted on the clamping arms to provide for the movement of a lifted bale to an adjusted position corresponding to a desired stacking or loading condition.

BRIEF DESCRIPTION OF THE DRAWINGS

FIG. 1 is a side elevational view of the bale handling apparatus shown in assembly relation with the three point hitch of a farm tractor; with portions of the tractor being broken away to more clearly show this assembly;

FIG. 2 is a front elevational view of the bale handling apparatus as seen on line 2—2 in FIG. 1;

FIG. 3 is a diagrammatic view showing a bale in transport position on the bale handling apparatus;

FIG. 4 is a reduced front perspective view of the apparatus;

FIG. 5 is an enlarged detail view showing the attachment of a bale inserting prong with a bale clamping arm;

FIG. 6 is a side elevational view of the bale handling apparatus provided with a modified form of bale clamping arm illustrated in position for picking up a bale extended longitudinally of the tractor;

FIG. 7 is a rear elevational view of the apparatus of FIG. 6 illustrated in position for picking up a bale extended transversely of the tractor;

FIG. 8 shows the apparatus of FIG. 6 with a lifted bale supported in a horizontal position;

FIG. 9 is an enlarged elevational view taken on line 9—9 in FIG. 6;

FIG. 10 is an enlarged detail elevational view as seen along lines 10—10 in either FIG. 2 or FIG. 7, with some parts shown in section;

FIG. 11 is a side elevational view of the apparatus of FIG. 1 shown in assembly with a tractor and illustrating a modified form of prong assembly;

FIG. 12 is an enlarged detail front elevational view of the prong assembly on the clamping arm of FIG. 11;

FIG. 13 is an enlarged detail rear elevational view of the prong assembly shown in FIG. 12;

FIG. 14 is an elevational view taken along the line 14—14 in FIG. 13;

FIG. 15 is a diagrammatic view showing the use of the apparatus of FIG. 11 for unrolling a cylindrical hay bale; and FIG. 16 is a diagrammatic view showing the use of the baler apparatus for elevating bales in an upright position.

DETAIL DESCRIPTION OF THE INVENTION

The bale handling apparatus of this invention, generally indicated as 20 in FIG. 1, is shown mounted on the three point hitch attachment 21 of a farm tractor 22, only the rear end portion of which is shown. The attachment 21 is of a usual type and includes generally a pair of tranversely disposed lift arms 23, each of which is operatively associated with a power crank arm 24, and a rear housing connection 26 which constitutes a third hitch point of the attachment 21.

The bale handling apparatus 20 (FIGS. 2 and 4) includes an upright main frame 27 having a pair of side members 28 interconnected by a bottom transverse base or drawbar member 29 and a pair of transverse mounting members 31 and 32 vertically spaced above the drawbar 29, with the mounting member 32 uppermost. The upper ends of the side members 28 terminate in loop or bearing members 33 for rotatably supporting a transverse rock shaft 34 that has end sections 36 projected laterally outwardly from corresponding side members 28.

Corresponding to the end sections 36 and movably supported at the outer ends thereof are a pair of bale clamping or gripping arms 37. The rock shaft 34 and clamping arms 37 are of a tubular construction and, as best appears in FIGS. 2 and 10, an upright top hinge plate 38 is secured to the terminal face of each end section 36. An upright bottom hinge plate 39 is comprised of a pair of plate sections secured, as by welding, to opposite sides of an arm member 37. The top and bottom hinge plates 38 and 39 are formed, respectively, with hinge bearings 41 and 42, relatively arranged in axial alignment for receiving a hinge pin 43. The hinge pins 43 extend transversely of the rock shaft 34 to provide for a pivotal movement of the terminal end sections 44 of the clamping arms 37 toward and away from each other. By virtue of the mounting of the upper ends of the clamping arms 37 on the rock shaft 34 it is also seen that the clamping arms 37 are pivotally movable up and down relative to the axis of the rock shaft 34 in response to a rocking movement of the rock shaft.

The rock shaft 34 is operated by means including a radially extended rock arm 46 located between the side members 28 of the main frame 27 and extended downwardly and rearwardly therefrom. A linearly extendible and retractable power means, illustrated as a hydraulic cylinder assembly 47, has one end connected to the free end of the rock arm 46 and an opposite end thereof pivotally connected to the upper transverse connecting bar 32.

Pivotal movement of the clamping arms 37 relatively to the hinge pins 43 is accomplished by means including a pair of hydraulic cylinder assemblies 48, corresponding to the clamping arms 37. Each cylinder assembly 48 has one end pivotally connected to a radially extended ear 49 secured to the rock shaft 34 at a position for contact engagement with the outer end of an adjacent bearing 33. The opposite end of a cylinder assembly 48 is pivotally connected to a radially extended ear 51 on a corresponding arm 37 arranged generally in the plane of an associated rock shaft ear 49. It is seen, therefore, that on extension of the hydraulic cylinders 48 the clamping arms 37 are moved away from each other and that when the cylinder assemblies 48 are retracted the clamping arms 37 are moved inwardly toward each other. It is to be noted that the contact engagement of the ears 49 with adjacent rock shaft bearings 33 provides for the ears 49 functioning as stop collars for limiting axial movement of the rock shaft relative to the bearings 33. The ears 49 and the radial arm 46 are interconnected by brace members 52.

The base member 29 (FIGS. 2 and 4) of the main frame 27 is provided at each end thereof with rearwardly projected mounting members 53 spaced transversely of the main frame 27 to receive between adjacent ones thereof a lift arm 23 of the three point hitch 21, it being understood that the transverse disposition of the lift arms 23 is different for different model tractors. Thus, in the mounting of the bale handling apparatus 20 on the tractor 22 the lift arms 23 are initially lowered to their lowermost position to facilitate their pivotal connection at 54 (FIG. 1) with selected pairs of the mounting members 53 on the base member 29. A connecting link 55 has its forward end pivotally connected to the third hitch point 26 and its rear end pivoted to a pair of spaced lugs 56 on the intermediate transverse connecting member 31. The line 55 is of a length to form a parallel link system with the lift arms 23 so that the main frame 27 is supported in an upright position on the tractor 22, and is maintained in such upright position for all moved positions of the lift arms 23.

In the bale lifting operation the clamping arms 37 are initially spread apart to their dotted line positions shown in FIG. 2 concurrently with being moved to their lowermost positions shown in FIG. 1, extended downwardly and rearwardly relative to the vertical plane of the main frame 27. This lowermost position of the clamping arms 37 is determined by the retracted position of the cylinder assembly 47 relative to the length of the rock arm 46 so as to form an angle of about forty degrees with the plane of the frame 27. The tractor 22 is then maneuvered to position a bale between the terminal ends 44 of the clamping arms 37 and against the rear side of the frame 27.

Each terminal end section 44 is equipped with a pair of bale gripping tongs 57 (FIGS. 2 and 5) spaced longitudinally of a corresponding arm 37, with the prongs 57 on one arm being projected inwardly toward the opposite arm. As shown in FIG. 5, each prong 57 has a bale penetrating section 58 and a shank section 59 for extension transversely of a clamping arm 37. A stop collar 61 at the junction of the sections 58 and 59 cooperates with a washer and cotter key assembly 62 for holding the prong against movement transversely of the clamping arm. On actuation of the cylinder assemblies 48 the end sections 44 are moved toward each other for insertion of the portions 57 within the ends of a hay bale 63, illustrated as being of a cylindrical shape, and for clamping the bale between the arms 37.

For transport purposes, and as illustrated in FIG. 3, the lift arms 23 are elevated to in turn lift the main frame 27 and the bale 63 in a clearance relation with the ground surface 64. If the bale 63 is to be loaded on a wagon or truck, a loading platform of which only is indicated at 66 in FIG. 1, the clamping arms 37 are elevated to their uppermost positions shown in dotted lines in FIG. 1 and the tractor 22 operated to move the bale 63 into a loading position. In this respect, it is to be understood that the arms 37 and lift arms 23 can both be elevated to their uppermost positions to obtain a maximum lifting height or position for the bale 63.

The bale lifting apparatus 20a illustrated in FIGS. 6-10, inclusive, is similar in all respects to the bale lifting apparatus 20 of FIGS. 1-5, inclusive, except for the modified construction of the lift arms 37a. Similar numerals of reference therefor will be used to indicate like parts.

Each lift arm 37a (FIGS. 6 and 7) is comprised of an upper section 67 and a lower or terminal section 68. In turn, each lower section 68 is of an articulated construction comprised of a top portion 69 and a bottom portion 71. The upper section 67 is hingedly connected to the rock shaft 34 in all respects similar to the hinged connection of the clamping arms 37. The top portion 69 of a terminal section 68 is pivoted at 72 to the lower end of an upper section 67 for pivotal movement about an axis parallel to the axis of a corresponding hinge pin 43. The top and bottom portions 69 and 71 of a terminal section 68 (FIG. 9) are pivotally interconnected at 73 for pivotal movement of the bottom portion 71 relative to the top portion 69 about an axis normal to the axis of the pivot 72.

It is seen, therefore, that a clamping arm 37a is pivotally moved as a unit relative to a hinge pin 43 by actuation of a corresponding hydraulic cylinder 48. The terminal section 68 of a clamping arm 37a is moved as a unit relative to the upper section 67 by a hydraulic cylinder assembly 74 pivotally interconnected to such sections, and with the sections 67 and 68 being in linear alignment when the cylinder assembly 74 is in the retracted position therefor. The bottom portion 71 of a terminal section 68 is moved relative to its adjacent top portion 69 by a hydraulic cylinder assembly 76 interconnected therebetween, with the portions 69 and 71 being in linear alignment when the cylinder assembly 76 is in its retracted position.

In a bale handling operation, and as illustrated in FIG. 6, the clamping arms 37a in their lower spread apart positions, are arranged to opposite sides of a hay bale 63. On closing of the lift arms 37a toward each other, the bale 63 is penetrated by prongs 57 carried in the bottom portion 71 of each lower or terminal section 68 concurrently with being clamped between the arms 37a. On lifting of the bale 63 to its position, illustrated for the dotted line position of the arms 37a in FIG. 6, it is seen that the bale is inclined upwardly and rearwardly between the arms 37a. To provide for horizontal loading of the bale 63 onto a loading platform 66 or the like it is only necessary to actuate the cylinders 76 to position the bale 63 horizontally between the lift arms 37a as illustrated in FIG. 8. With the bottom portion 71 in their actuated positions, shown in FIG. 8, the clamping arms 37a are swung away from each other about the hinge pivots 43 by actuation of the cylinders 48. The bale 63 is thus horizontally unloaded and the baling apparatus 20 is free for another bale lifting operation.

To facilitate the end clamping of bales the clamping arms 37a are moved to their spread apart positions, as shown in FIG. 7, with the terminal sections 68 inclined relative to the upper sections 67 so as to extend in planes substantially parallel to the side members 28 of the main frame 27. The terminal sections 68 are thus in a substantially parallel relation with the end faces 77 of a bale 63 so that on inward movement of the arms 37a to their clamping positions, the sections 68 are in substantial clamping engagement with such end faces 77 over the full linear extent thereof.

The bale handling apparatus 20b illustrated in FIGS. 11-16, inclusive, is similar in all respects to the bale handling apparatus 20 of FIGS. 1-5, inclusive, except for a modified construction of the bale penetrating prong assemblies 78. Again, and for the purpose of convenience of description, like numerals will be used to indicate like parts.

Each prong assembly 78 for a corresponding clamping arm 37 includes a mounting plate 79 of a substantially square shape and prongs 81 positioned adjacent the corners thereof. A mounting plate 79 is rotatably supported at the central portion thereof adjacent the free end of a clamping arm 37 on a shaft 82 transversely extended through a clamping arm with the axis thereof parallel to the axis of the rock shaft 34. The mounting plates 79 are arranged in a facing relation so that the prongs 81 on opposite arms 37 are directed inwardly toward each other.

On the lifting of a horizontally positioned bale 63 by clamping the sides thereof and as illustrated in FIG. 16, the bale 63 is elevated in an upright position by virtue of the rotatable support of the prong assemblies 78 on the clamping arms 37. In the lifting of a bale 63 by engaging the end faces 77 thereof, as shown in FIG. 15, the bale will retain a horizontally extended position at all elevated positions of the arms 37. It will also be apparent from FIG. 15 that the bale 63 may be unrolled for feeding purposes when engaged in the end faces 77 by the prong assemblies 78. In this regard, it is only necessary to remove the usual binding twine from about the bale 63 and then rotate the bale in a direction opposite to the direction in which it was formed.

To provide for the lifting of the bale in a horizontally extended position, each lift arm 37 (FIGS. 12, 13 and 14) is provided with a connecting member 83 spaced upwardly of an arm 37 from a prong assembly 78. A coil spring 84 is arranged in compression between the connecting member 83 and an ear 86 secured to and projected from a mounting plate 79 in a direction opposite from the prongs 81 so that the axis of a spring 84 is substantially parallel to the axis of a clamping arm 37. The ear 86 also functions as a stop that is engageable with a lift arm 37 to limit the rotation of a prong assembly 78 in one direction, and with the spring 84 acting to continuously bias a prong assembly 78 toward such stop position. Rotation of a prong assembly 78 in an opposite direction is limited by an adjustable flexible member, illustrated as a chain 88, secured at one end to a mounting plate 79 and adjustably attached at its opposite end to the connecting member 83.

Thus, as illustrated in FIG. 11, when a bale 63 is engaged at opposite side portions thereof by the clamping arms 37, its rotation on the prong assemblies 78 will be limited in one direction by the adjusted position of the chain 88 and in an opposite direction by the stop member 86. The adjusted position of the chain 88 is dependent upon the height to which a bale 63 is to be elevated. By removing the ear 86, spring 84 and chain 88, the prong assemblies 78 will operate in all ways as discussed in connection with FIGS. 15 and 16.

Although the invention has been described with respect to several preferred embodiments thereof, it is to be understood that it is not to be so limited since changes and modifications can be made therein which are within the full intended scope of this invention as defined by the appended claims.

I claim:

1. Apparatus for handling hay bales comprising:
   a. a portable frame,
   b. an upright main frame extended transversely of said portable frame,
   c. means supporting said upright frame adjacent one end of said portable frame,
   d. a pair of bale gripping arms arranged at opposite sides of said upright frame,
   e. means movably supporting one of the ends of said jaws adjacent the upper end of said upright frame for pivotal movement of the opposite ends of said jaws toward and away from each other transversely of said main frame and for pivotal movement toward and away from said one end of the portable frame, including a transverse rock shaft rotatably supported at the upper end of said upright frame having end portions projected laterally outwardly from opposite sides of said main frame, and
   f. means pivotally supporting the one ends of said bale gripping arms on said rock shaft end portions for pivotal movement about axes extended transversely of said rock shaft.

2. The apparatus for handling hay bales according to claim 1 including:
   a. means for pivotally moving said bale gripping arms about the axis of said rock shaft comprising a rock arm on said rock shaft, and linearly extendible and retractible power means extended between and movably connected to said rock arm and main frame, and
   b. other means for pivotally moving said bale gripping arms about said transverse axes including a pair of linearly extendible and retractible power means corresponding to said bale gripping arms, each of said last mentioned power means extended between and movably connected to said rock shaft and a corresponding bale gripping arm.

3. The apparatus for handling hay bales according to claim 1 wherein:
   a. each of said bale gripping arms includes an upper section and a lower section,
   b. means pivotally connecting a lower section to a corresponding upper section for pivoted movement about an axis normal to the axis of said rock shaft from a first position in axis alignment with the upper section to a second position inclined inwardly of the upper section, and
   c. prong members on each of said lower sections projected laterally inwardly of a bale gripping arm.

4. The apparatus for handling hay bales according to claim 3 wherein:
   a. a lower section includes an upper portion and a lower portion, and
   b. means pivotally connecting together said upper portion and lower portion for pivotal movement of said lower portion about an axis parallel to the axis of said rock shaft from a first position in axial alignment with said upper portion to a second position inclined relative to said upper portion,
   c. said prongs being mounted on said lower sections.

5. Apparatus for handling hay bales comprising:
   a. a portable frame,
   b. an upright main frame extended transversely of said portable frame,
   c. means supporting said upright frame adjacent one end of said portable frame,
   d. a pair of bale gripping arms arranged at opposite sides of said upright frame,
   e. means movably supporting one of the ends of said jaws adjacent the upper end of said upright frame for pivotal movement of the opposite ends of said jaws toward and away from each other transversely of said main frame and for pivotal movement toward and away from said one end of the portable frame, f. a prong assembly for each of said bale gripping arms comprising a flat mounting member, g. means rotatably supporting a mounting member adjacent the other end of each bale gripping arm for rotation about a transverse axis of a bale gripping arm, with the mounting members arranged in a facing relation, h. a plurality of prong members corresponding to each mounting member secured in a spaced relation thereon, with the prong members on said mounting members projected toward each other, i. coacting means on each mounting member and bale gripping arm for limiting the movement of a corresponding prong assembly in one direction of rotation, and j. adjustable means connected to each mounting member and bale gripping arm for limiting the movement of a corresponding prong assembly in an opposite direction of rotation.

6. The apparatus for handling hay bales according to claim 5 including:

a. means for yieldably urging a prong assembly in said one direction of rotation.

7. A hay bale handling attachment for a farm tractor having a three point hitch connection, said attachment including:

a. a main frame extended transversely of the tractor, b. means for connecting said frame in an upright position to said three point hitch connection for up and down movement in said upright position.

c. a pair of bale gripping arms arranged at opposite sides of said frame, d. a transverse rock shaft on the top of said frame having laterally projected end portions corresponding to said arms, e. means pivoting one end of an arm on a corresponding end portion for pivotal movement of said arm about a transverse axis of said rock shaft, f. a pair of power units corresponding to said arms for moving said arms about the transverse axes therefor, each power unit extended between and connected to said rock shaft and a corresponding arm, g. power means connected to said frame and rock shaft for rockably moving said rock shaft, and h. prong members mounted on each arm adjacent the free end thereof with the prong members on one arm projected therefrom toward the other arm.

* * * * *